United States Patent [19]

Pogoda

[11] 4,335,642
[45] Jun. 22, 1982

[54] STROBOSCOPIC TUNING

[76] Inventor: Gary S. Pogoda, 223 N. Douglass Ave., Margate, N.J. 08402

[21] Appl. No.: 144,976

[22] Filed: Apr. 30, 1980

[51] Int. Cl.³ .............................................. G10G 7/02
[52] U.S. Cl. ...................................... 84/454; 362/293
[58] Field of Search ..................... 84/454, 455, 464 R, 84/477 R, DIG. 18; 362/800, 293

[56] References Cited

U.S. PATENT DOCUMENTS 4,061,071 12/1977 Cameron ............................... 84/455

FOREIGN PATENT DOCUMENTS 2651619 5/1978 Fed. Rep. of Germany ...... 362/800

Primary Examiner—L. T. Hix
Assistant Examiner—Stafford D. Schreyer
Attorney, Agent, or Firm—Duffield & Lehrer

[57] ABSTRACT

A stringed musical instrument is tuned by illuminating a portion of a vibrating string with a monochromatic stroboscopic light source. The illuminated string portion is viewed through a monochromatic filter of the same color as the light source. The string tension is then adjusted until the desired stationary stroboscopic effect is achieved.

7 Claims, 3 Drawing Figures

STROBOSCOPIC TUNING

BACKGROUND OF THE INVENTION

This invention is directed toward a method and device for stroboscopically tuning a stringed musical instrument and more particularly toward such a method and device which utilizes a monochromatic stroboscopic light source and a compatible monochromatic filter for viewing the light reflected from the vibrating string being tuned.

Stroboscopic tuning of stringed musical instruments such as guitars and the like has been known for some time. This type of tuner basically includes a light source which turns on and off at a predetermined and preset frequency which frequency is equal to the desired frequency of the string to be tuned. When the strobe light is shined on the string, the well-known stroboscopic movement is observed and as the string is brought into tune, movement stops and the illuminated portion of the string appears to be standing still. One such device is shown, for example, in U.S. Pat. No. 4,061,071. A specific arrangement for combining a stroboscopic tuner with a guitar pick is shown in Applicant's co-pending application Ser. No. 120,061 filed Feb. 11, 1980, the entire subject matter of said application being incorporated herein by reference.

While the stroboscopic tuning technique is quite accurate and relatively easy to master, it does have its drawbacks, particularly when utilizing a small hand held tuner such as described in Applicant's above-mentioned co-pending application. In a dimly lit room, such a stroboscopic tuner will produce sufficient stroboscopic light so that the effect on the vibrating string can be easily seen. However, in a very well lit room it may be extremely difficult to observe the stroboscopic light being reflected from the vibrating string. The stroboscopic tuning device is, of course, totally ineffective if the stroboscopic light being shined on the string cannot be readily observed.

SUMMARY OF THE INVENTION

The present invention overcomes the above-mentioned drawbacks of previously known stroboscopic tuning devices. This is accomplished by illuminating a portion of a vibrating string with a monochromatic stroboscopic light source. The illuminated string portion is simultaneously viewed through a monochromatic filter of the same color as the light source. The filter filters out all other light which otherwise would interfere with the observation of the stroboscopic effect from the stroboscopic light source. The string tension is then adjusted in the conventional manner until the desired stationary stroboscopic effect is achieved.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

DETAILED DESCRIPTION OF THE PREFERRED EMBODIMENT

Figure 1:
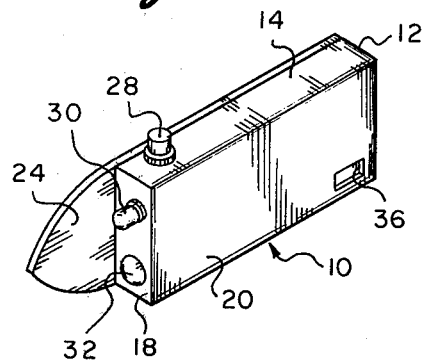
FIG. 1 is a perspective view of a hand held stroboscopic tuning device which may be used for practicing the present invention.

Referring now to the drawing in detail wherein like reference numerals have been used throughout the various figures to identify like elements, there is shown in FIG. 1 a hand held stroboscopic tuning device which may be utilized to practice the present invention and which is designated generally at 10. The operative parts of the device are contained in or mounted on a substantially rectangularly-shaped housing 12 having a top wall 14, a bottom wall 16, a forward end wall 18 and a front wall 20. This housing 12 is relatively small so that it can be easily held in the palm of a person's hand. By way of example and not limitation, the housing 12 may be 1 inch high by 2 inches long by ½ inch deep.

Figure 2:
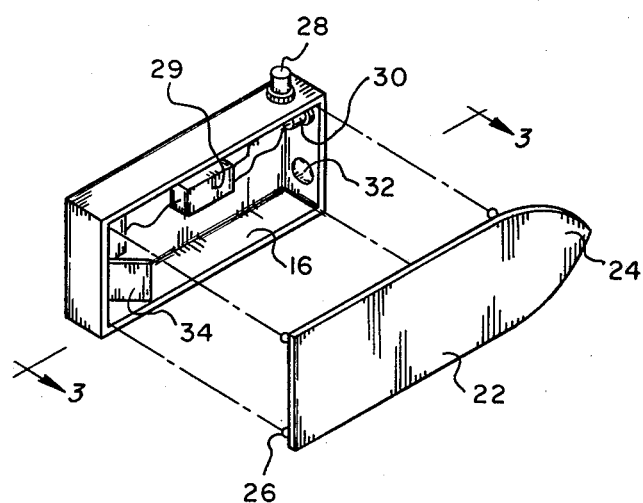
FIG. 2 is a rear perspective exploded view of the device shown in FIG. 1.
Figure 3:
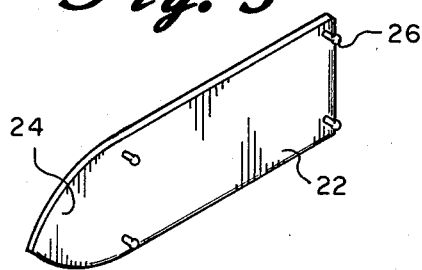
FIG. 3 is a perspective view of the pick portion of the device taken along the line 3—3 of FIG. 2.

As shown most clearly in FIG. 2, the back of the housing 12 is normally open. It is closed by a cover member 22 having a substantially rectangular shape similar to the shape of the front 20 but being slightly longer and terminating in a rounded rectangularly-shaped forward portion 24. The inside surface of the back cover member 22 has a plurality of upstanding pins 26 which are intended to be forced fit into the corners of the housing 12 as shown in FIG. 2 so as to maintain the back cover 22 in place on the housing 12. With the cover 22 in place, the forward end 24 thereof extends forwardly of the housing 12 as shown in FIG. 1 and may be used as a pick for playing a musical stringed instrument such as a guitar or the like.

The cover 22 or at least the forward end 24 thereof is made of a translucent colored material so that it can function as a light filter means in a manner and for the reasons described hereinafter. It is also possible to make the pick section 24 and the remaining parts of the cover 22 in two parts. That is, the cover 22 may have a holding or securing means at the forward end thereof for holding a standard-shaped guitar pick. In this way, the pick can be changed or removed whenever desired.

Mounted on the top wall 14 adjacent the forward end thereof is a switch means 28 such as a momentary contact switch which is used to control the stroboscopic tuner circuit 29 mounted within the housing or support structure 12. The circuit 29 and the operation thereof by means of the switch 28 are beyond the specific scope of the present application. They are, however, described in detail in Applicant's co-pending application Ser. No. 120,061 filed Feb. 11, 1980 and the subject matter of that application is incorporated herein by reference.

A light emitting diode 30 which functions as the stroboscopic light source is mounted on the front wall 18 adjacent the pick 24. The LED 30 preferably emits a monochromatic light. The wave length of the light is selected to be substantially equal to the wave length which corresponds to the color of the translucent pick 24. Thus, the light emitted from the LED 30 will be capable of being seen through the pick 24 which functions as a light filter means but all other visible light wave lengths will not pass through. The color of the LED 30 can be selected by either utilizing an LED of a particular color such as a red LED or by placing a lens or filter over the LED. It should also be readily apparent that a stroboscopic light source other than an LED could be utilized.

Below the strobe light 30 is a lens 32. The lens 32 allows light impinging thereon to be directed into the interior of the housing 12. A mirror 34 located within the housing deflects the light through the window opening or viewing window 36. The lens 32, mirror 34 and viewing window 36 allow the user to observe a vibrating string from a right angle if desired since there are times when it might be difficult to directly observe the same. Preferably, it is also desirable to tint the lens 32 so as to be substantially the same color as the strobe light 30. Alternatively, a colored filter could be placed over the window 36.

The invention described above is utilized in the following manner. The device 10 is held in a person's hand and the desired strobe frequency representing the frequency of the string to be tuned is selected. Strobe light 30 will then strobe at the desired audio frequency and will emit a monochromatic light which, when held in the proper position, will illuminate a portion of the string which has been plucked so that the same is vibrating. While the vibrating string is being illuminated by the strobe light, the same is observed through the pick 24 which functions as a filter means. Since the pick 24 is the same color as the strobe light, the reflected light from the string will pass through the filter but all other extraneous light will be blocked. Thus, even in a well-lit environment, the user of the device can easily observe the stroboscopic pattern on the vibrating string. In situations where the string cannot be observed through the pick 24 while the strobe light is illuminating the same, it will be possible to observe the string through the window 36 with the same filtering effect.

The foregoing general description refers to the strobe light source and filter means (the pick 24, lens 32 or window 36) as being monochromatic. In the preferred embodiment, red is the desired color. It should be readily apparent to those skilled in the art, however, that the desired advantages of the present invention can be achieved whenever a light source having a predetermined spectral content is utilized. This predetermined spectral content must be less than the spectral content of white light and the filter means must be capable of passing only light of the same spectral content. The best results will, of course, be achieved when the light source has a sharply peaked spectral content. Ideally the spectral content will be light of a single color or close to a single color and thus substantially monochromatic. The filter means will, of course, be chosen to be compatible with the particular strobe light source.

The present invention may be embodied in other specific forms without departing from the spirit or essential attributes thereof and accordingly, reference should be made to the appended claims rather than to the foregoing specification as indicating the scope of the invention.

I claim:

1. In a method for tuning a stringed musical instrument comprising:
    providing a visible stroboscopic light source having a predetermined spectral content which is less than the spectral content of white light;
    illuminating a portion of the vibrating string of a musical instrument with said light source;
    observing said illuminated string portion through a filter means which passes substantially only light having said predetermined spectral content, and
    adjusting the tension of said string until the desired stroboscopic pattern is observed.

2. The method as claimed in claim 1 wherein said light source is substantially monochromatic.

3. In a stringed musical instrument tuning device, the improvement comprising:
    a visible stroboscopic light source having a predetermined spectral content which is less than the spectral content of white light;
    a structural support means for supporting said light source, said support means being of sufficiently small size so that it can be conveniently held in a person's hand, and
    a filter means carried by said support means, said filter means being capable of passing substantially only light having the spectral content of the light source, said filter means and said light source being arranged so that light emitted from said light source and reflected by a vibrating string may be viewed through said filter means.

4. The improvement as claimed in claim 3 further including a pick carried by said support means.

5. The improvement as claimed in claim 4 wherein said pick is comprised of a translucent material and constitutes said filter means.

6. The improvement as claimed in claim 3 wherein said light source is substantially monochromatic.

7. The improvement as claimed in claim 3 wherein said light source is a light emitting diode means.

* * * * *